(12) United States Patent
Chaves

(10) Patent No.: US 7,680,779 B2
(45) Date of Patent: Mar. 16, 2010

(54) MANAGING QUERIES IN A DISTRIBUTED DATABASE SYSTEM

(75) Inventor: Leonardo Weiss F Chaves, Karlsruhe (DE)

(73) Assignee: SAP AG, Walldorf (DE)

( * ) Notice: Subject to any disclaimer, the term of this patent is extended or adjusted under 35 U.S.C. 154(b) by 263 days.

(21) Appl. No.: 11/627,536

(22) Filed: Jan. 26, 2007

(65) Prior Publication Data

US 2008/0183671 A1    Jul. 31, 2008

(51) Int. Cl.
G06F 17/30    (2006.01)
(52) U.S. Cl. .......................... 707/3; 709/202; 709/203; 711/113; 711/114
(58) Field of Classification Search .................. None
See application file for complete search history.

(56) References Cited

U.S. PATENT DOCUMENTS

| | | | |
|---|---|---|---|
| 4,769,772 A | 9/1988 | Dwyer | |
| 5,446,886 A | 8/1995 | Li | |
| 5,694,591 A | 12/1997 | Du et al. | |
| 6,009,428 A | 12/1999 | Kleewein et al. | |
| 6,032,144 A | 2/2000 | Srivastava et al. | |
| 6,092,061 A | 7/2000 | Choy | |
| 6,505,191 B1 * | 1/2003 | Baclawski | 707/3 |
| 7,031,958 B2 | 4/2006 | Santosuosso | |
| 2003/0216969 A1 | 11/2003 | Bauer et al. | |
| 2005/0149414 A1 * | 7/2005 | Schrodt et al. | 705/29 |
| 2006/0167847 A1 * | 7/2006 | Bangel et al. | 707/3 |

OTHER PUBLICATIONS

Banerjee et al., "Radio frequency identification based manufacturing and distribution: an exploratory overview," *Proceedings of the 21st National Convention of Production Engineers and National Seminar on "Best Practices in Manufacturing,"* Ranchi, India, Dec. 9-10, 2006, pp. 87-104.

Brunkhorst et al., "Distributed queries and query optimization in schema-based P2P-systems," *Databases, Information Systems, and Per-to Peer computing Lecture Notes in Computer Science*, Springer Verlag, 2004, vol. 2944, pp. 184-199.

Date, "Distributed Databases," in: Reading, *Introduction to Database Systems*, (US, Addison Wesley, 1985), pp. 291-340.

Hameurlain et al., "How can mobile agents and cost model approaches help for distributed query optimization?" *17th International Conference on Database and Expert Systems Applications*, 2006, Los Alamitos, CA, pp. 617-621.

(Continued)

*Primary Examiner*—Apu M Mofiz
*Assistant Examiner*—Anteneh Girma
(74) *Attorney, Agent, or Firm*—Fish & Richardson P.C.

(57) ABSTRACT

Queries in a distributed database system are received at computer devices participating in the database system. A determination is made as to which of the respective, participating computer devices has data relevant to the query. Information about the computer devices(s) which has or have the relevant data is communicated to the participating computer devices. Such information is used to determine, at each of the respective participating computer devices, a benefit value for at least one of the participating computer devices. A determination is made as to which the participating computer devices will process the query by comparing the benefit values for the participating computer devices.

18 Claims, 4 Drawing Sheets

OTHER PUBLICATIONS

Kossman, "The state of the art in distributed query processing," *ACM Computing Surveys*, 2000, 32(4): 422-469.

Slimani et al., "An adaptive cost model for distributed query optimization on the grid," On the Move to Meaningful Internet Systems 2004:OTM 2004 Workshops, 2004, vol. 3292, pp. 79-87.

Affordable Parallel Database: Dual Degree Project Report' [online]. Maloo, 2006, [retrieved on Feb. 25, 2007]. Retrieved from the Internet: <URL: www.cse.iitb.ac.in/maloo/ddp/report-temp.pdf>, 40 pages.

'Affordable Parallel Database: Dual Degree Project Stage-II Report' [online]. Maloo, 2005, [retrieved on Jan. 25, 2007]. Retrieved from the Internet: <URL: www.cse.iitb.ac.in/maloo/ddp/maloo-stage2.pdf>, 30 pages.

'Database Tuning Advisor for Microsoft SQL Server 2005' [online]. Microsoft Corporation, 2004, [retrieved on Jan. 24, 2007]. Retrieved from the Internet: <www.isys.ucl.ac.be/vldb04/eProceedings/contents/pdf/IND4P3.PDF>, 12 pages.

Hull and Zhou. "Towards the study of performance trade-offs between materialized and virtual integrated views." In Workshop on Materialized Views, pp. 91-102, Jun. 1996, 12 pages.

Zilio et al. "Recommending Materialized Views and Indexes with IBM DB2 Design Advisor," First International Conference on Autonomic Computing (ICAC'04), 2004, pp. 180-188.

'View Management in Distributed Data Base Systems' [online]. Bertino, 1983, [retrieved on Jan. 26, 2007]. Retrieved from the Internet: <URL: wwvv.vldb.org/conf/1983/P376.PDF>, 3 pages.

'Distributed Transaction Processing in the Escada Protocol' [online]. Correia, 2004, [retrieved on Jan. 27, 2007]. Retrieved from the Internet: <URL: gsd.di.uminho.pt/members/alfranio/papers/thesis-final.pdf>, 127 pages.

\* cited by examiner

MANAGING QUERIES IN A DISTRIBUTED DATABASE SYSTEM

TECHNICAL FIELD

This disclosure relates to database systems.

BACKGROUND

Performance of database systems may be enhanced by materializing views, building indexes, and creating horizontal partitions. Such optimizations, however, are not generally well-suited for distributed database systems.

SUMMARY

According to one implementation, a method of managing queries in a distributed database system involves receiving a query at computers (that is, computer devices) participating in the database system. A determination is made as to which of the participating computers may have data relevant to the query. In one possible implementation, the query has been broadcast to all participating computers. Information about those computers which have relevant data is communicated to the participating computers. The information communicated is used at each of the respective participating computers to determine a respective benefit value. Each computer determines a benefit value for at least one of the participating computers. By comparing the benefit values thus determined, a determination is made of which of the participating computers will process the query.

According to one variation, the determination of which of the participating computers will process the query is made at run-time.

According to another variation, the benefit value of each of the participating computers are communicated among all the participating computers prior to determining which computer will process the query.

In one implementation, a computer-implemented information system includes a database configured to receive one or more queries from one or more users. The information system also includes multiple, networked computer devices. An information distribution subsystem is comprised of suitable hardware, software, or both so that it is capable of determining which of the respective, participating computer devices has data relevant to the query, and is likewise able to communicate information to the participating computer devices about those computer devices which have the relevant data. The system also includes an optimization engine with routines for calculating or otherwise determining various parameters useful in assessing the suitability of one or more of the participating computer devices to process the query. Such routines may be executed at run time, and may use one or more parameters to determine a benefit value or other type of score corresponding to the suitability of the participating computer devices for processing the query.

A database system, according to one implementation, may be used to manage an inventory of items. The items are tagged or otherwise computer-trackable. The database system includes multiple, networked computer devices participating in the database. Some or all of the computer devices may include readers capable of detecting the presence of items in inventory, and storing data related to such items. Another computer device, a store server, is operably connected to the readers and capable of operations related to the inventory. A data center processes information from the readers, the store servers, or both.

The database system includes suitable software, hardware, or a combination of the two for determining which of the networked computer devices will be used to process queries received by the database system. Thus, for example, suitable software and/or hardware calculates in an initialization, network usage, and memory usage, for one or more of the computers. Based on some or all of the foregoing calculations, suitable software and/or hardware calculates a benefit value associated with the one or more computer devices. Based on a comparison of the benefit values for respective computer devices, a determination is made as to which of the participating computer devices shall process the query.

The details of one or more implementation are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
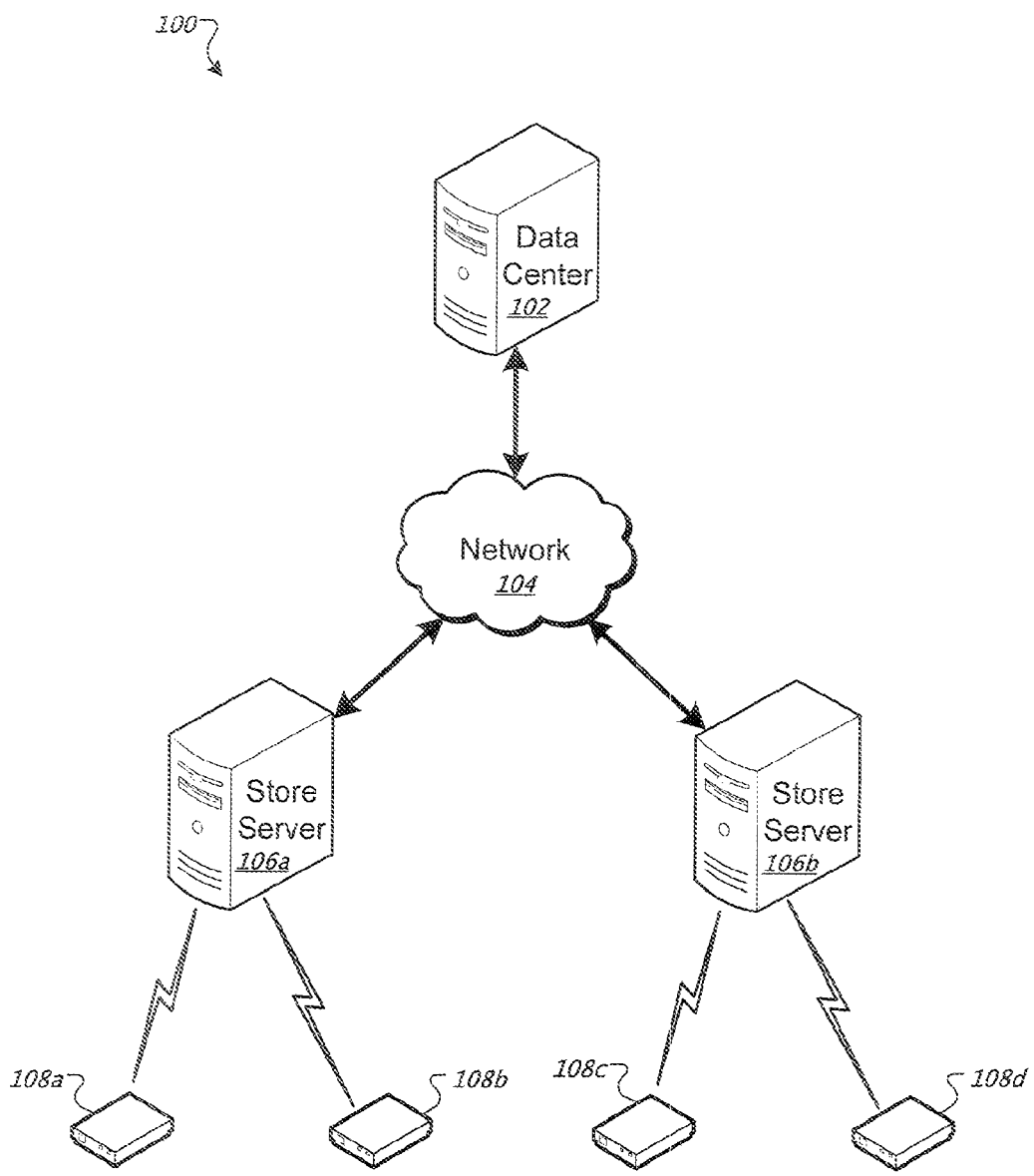
FIG. 1 is a schematic diagram showing an example of a distributed database system for managing queries.

FIG. 1 is a schematic diagram showing an example of a distributed database system 100 for managing queries. The system 100 includes multiple computer devices at which data may be distributed for storage and at which queries may be performed on the data. In particular, the computer devices in the system 100 determine at which computer device a query will be performed based on information regarding the computer devices in the system 100. The terms computer device and computer are used interchangeably herein to mean devices capable of processing instructions or otherwise equipped with one or more processors, such as computer workstations, laptops, desktops, servers, scanners, readers, and the like.

The system 100 is a hierarchical network of data storage computer devices in a retail company inventory system. Alternatively, the data storage computer devices in the system 100 may be non-hierarchical, such as peer-to-peer devices. The system 100 includes a data center 102, a network 104, store servers 106a-b, and radio frequency identification (RFID) devices 108a-d. Data in the system 100 may be distributed over any or all of the data center 102, the store serves 106a-b, and the RFID devices 108a-d.

The data center 102 is an enterprise resource planning system that integrates processes of the system 100 into a unified system. The data center 102 may include a back-end data warehouse system. The data center 102 is in communication with the store servers 106a-b through the network 104. The system 100 generally includes multiple stores and each store generally includes at least one store server. The network 104 may be a network, such as a local area network (LAN), a wide area network (WAN), or the Internet. The network 104 may be wire-line, wireless, or a combination thereof.

The RFID devices 108a-d gather information regarding item inventories at a particular location in a store, such as a shelf or a display case, and can report the information to the store servers 106*a-b* and/or the data center 102. The RFID devices 108*a-d* may communicate with the store servers 106*a-b* using a wireless network, a direct connection (e.g., universal serial bus or RS232), or a wired network, such as the network 104. For example, the RFID devices 108*a-d* may be smart shelves capable of tracking item inventory as consumers remove items from shelves. Alternatively, the RFID devices 108*a-d* may be smart gates at exits of stores that track item inventories as consumers purchase and remove items from a store.

In general, a user requests that a query be performed on the data in the system 100 and the query is broadcast to the computer devices in the system 100. For example, a store may include a product having a high incidence of theft, such as razor blades. The razor blades at a particular store may be sold in two locations, such as a bathing accessories location and a location near a cash register. Inventory at the two locations may be tracked by the RFID devices 108*a-b*. A consumer may buy one or two razor blades in a typical purchase, while a person stealing razor blades typically steals five or more during each theft. The user may create a recurring query, such as a trigger or an active query, that is performed or processes when the data relevant to the query changes. For example, the user may create a trigger that notifies employees at a store when five or more razor blades have a status of missing within any five second time interval. That is, if the RFID tags of five or more razor blade items are reported as being removed from a shelf by an RFID device (e.g., the devices 108*a-b*) within a five second time interval, then the employees of the store are notified of the possible theft in progress. The following is an example of a razor blade theft notification trigger:

```
DELIMITER //
CREATE TRIGGER CheckRazorBlades AFTER UPDATE ON Items
    FOR EACH ROW BEGIN
        IF (SELECT COUNT(ItemID)
            FROM Items
            WHERE VendorID = 'Gillette'
            AND ProductID = 'Razors'
            AND Status = 'missing'
            AND StatusTime > NOW( ) - INTERVAL 5 SECONDS;) < 5
        THEN
            SELECT send_msg("Worker", "Gillettes are being stolen!");
        END IF;
    END; //
```

After the query is broadcast to the computer devices in the system 100, computer devices participating in the query determine if they have data relevant to the query. In one implementation, each of the participating computer devices makes such a determination. For example, the RFID devices 108*a-b* at the cash register and bathing accessories locations, respectively, may determine that they have razor blade inventory data that is relevant to the CheckRazorBlades query. In certain implementations, the computer devices perform a sub-query to determine if they have data relevant to the query. For example, the store server 106*a* and the RFID devices 108*a-b* may identify the VendorID and ProductID columns in the WHERE clause of the query as foreign keys. The store server 106*a* and the RFID devices 108*a-b* may perform a sub-query using the foreign key conditions from the WHERE clause to determine if they contain data relevant to the query. For example, the store server 106*a* and the RFID devices 108*a-b* may perform the following sub-query:

SELECT COUNT (ItemID)
FROM Items
WHERE VendorID='Gillette'
AND ProductID='Razors';

The computer devices having relevant data communicate information about themselves to the computer devices participating in the query. For example, the RFID devices 108*a-b* may broadcast information about themselves to the system 100, such as an amount of data identified as a result of the sub-query and an amount of updates typically made to the identified data during a given time interval. In addition, the RFID devices 108*a-b* may broadcast other information, such as information about available central processing unit (CPU) cycles, available memory space (e.g., hard disk or random access memory), available upload network bandwidth, and available download network bandwidth.

The computer devices participating in the query receive the broadcasted information. For example, the store server 106*a* and the RFID devices 108*a-b* may receive the broadcasted information. The participating computer devices use the received information to determine benefit values. The benefit values are an evaluation of the benefits of performing the query at a particular participating computer device. For example, each participating computer device may calculate an amount of time to download the relevant data from each of the computer devices having relevant data. In another example, each participating computer device may calculate an amount of bandwidth used when downloading updates made to the relevant data. In another example, each participating computer device may calculate an amount of memory used by the relevant data. In certain implementations, each participating computer device calculates a composite benefit value using the initialization time, network usage, and memory usage calculation values.

Each participating computer device communicates the calculated benefit value to the other participating computer devices. Each participating computer device compares its benefit values to the benefit values of the other participating computer devices to determine if it has the highest benefit value. The participating computer device with the highest benefit value performs the query. For example, the store server 106*a* may determine that it has the highest benefit value and accordingly it processes the CheckRazorBlades trigger query. The RFID devices 108*a-b* each determine that they do not have the highest benefit value and accordingly they do not process the CheckRazorBlades trigger query.

In an alternative implementation, each participating computer device may calculate benefit values for each of the participating computer devices using information received from the participating computer devices. Each participating computer compares its benefit value to the benefit values it calculated for the other participating computer devices. If a participating computer device determines that it has the highest benefit value, then it processes the query.

In certain implementations, the determination of which participating computer device will process the query is made at run-time. In general, the system 100 may receive multiple query requests over time such that the information provided by the computer devices having relevant data and/or all of the participating computer devices may change over time. For example, as a result of processing the CheckRazorBlades trigger query, the available CPU cycles of the store server 106*a* may decrease. The decrease may result in the benefit value for another computer device in a subsequent query being higher than the benefit value of the store server 106*a*.

The system 100 includes hardware, software, or a combination of both to accomplish the operations discussed therein. Functionally, system 100 may be characterized as having modules, engines, or subsystems. So, in one implementation, the computer devices access an information distribution subsystem, for determining whether the computer devices are associated with relevant information, and an optimization engine, for determining which of the computer devices should process a query received, or to be performed, by system 100. The optimization engine may include routines for calculating or otherwise determining various parameters useful in assessing the suitably of one or more computer devices to process the query. Such routines may be executed at run time and may use one or more parameters to determine a benefit value or other type of score corresponding to the suitability for the query. The functional constructs of a sub-system, engine, or routine may be distributed across any number of the computer devices and the use of such terms is not intended to limit the location or locations where the functions are performed in system 100. System 100 as described above is exemplary only, and other structures, architectures and implementations of system 100 are possible. Distributed database systems, for example, may take on any number of forms, depending on the associated applications, which are not limited to inventory control or even business or enterprise systems. Computer devices and readers other than RFID readers are likewise contemplated, such as bar-code readers or other scanners.

cated information. Alternatively, each participating computer may calculate the benefit values for each of the participating computers.

The process 200 communicates (210) the benefit values to the participating computers. For example, each of the participating computers may broadcast its benefit value to the other participating computers in the system 100.

The process 200 determines (212) which of the participating computers will process the query by comparing the benefit values. For example, the store server 106a determines that it has the highest benefit value and accordingly it processes the query. The RFID devices 108a-b each determine that they do not have the highest benefit value and accordingly they do not process the query.

Figure 3:
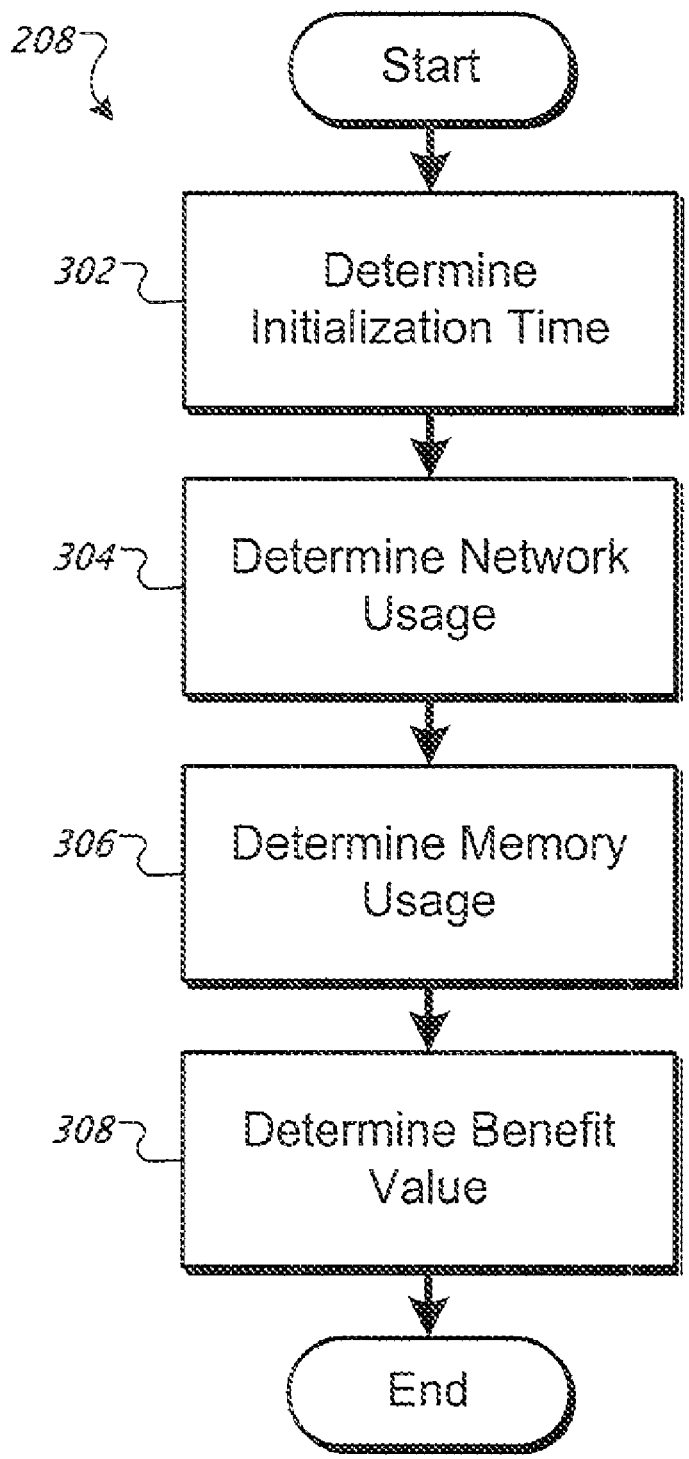
FIG. 3 is a flow chart sowing an example of a process for determining a benefit value in a distributed database system.

FIG. 3 is a flow chart showing another example of a process 208 for determining a benefit value in a distributed database system. The process 208 begins with calculating (302) an initialization time. The initialization time for a computer is the amount of time that the computer uses to download the initial relevant data. For example, the information regarding the store server 106a and the RFID devices 108a-b may include:

Table showing information regarding participating computers

| Participating Computer | Free CPU (cpu) | Free Up/Down (up, down) | Free RAM (mem) | Amount of Relevant Data (init) | Amount of Updates to Relevant Data (update) |
|---|---|---|---|---|---|
| Store server 106a | 1,000 MHz | 12/16 Mb/s | 121 MB | 0 bits | 0 bits |
| RFID device 108a | 200 MHz | 6/2 Mb/s | 19 MB | 32,120 bits | 64,224 bits |
| RFID device 108b | 233 MHz | 4/4 Mb/s | 21 MB | 430,560 bits | 107,640 bits |

Figure 2:
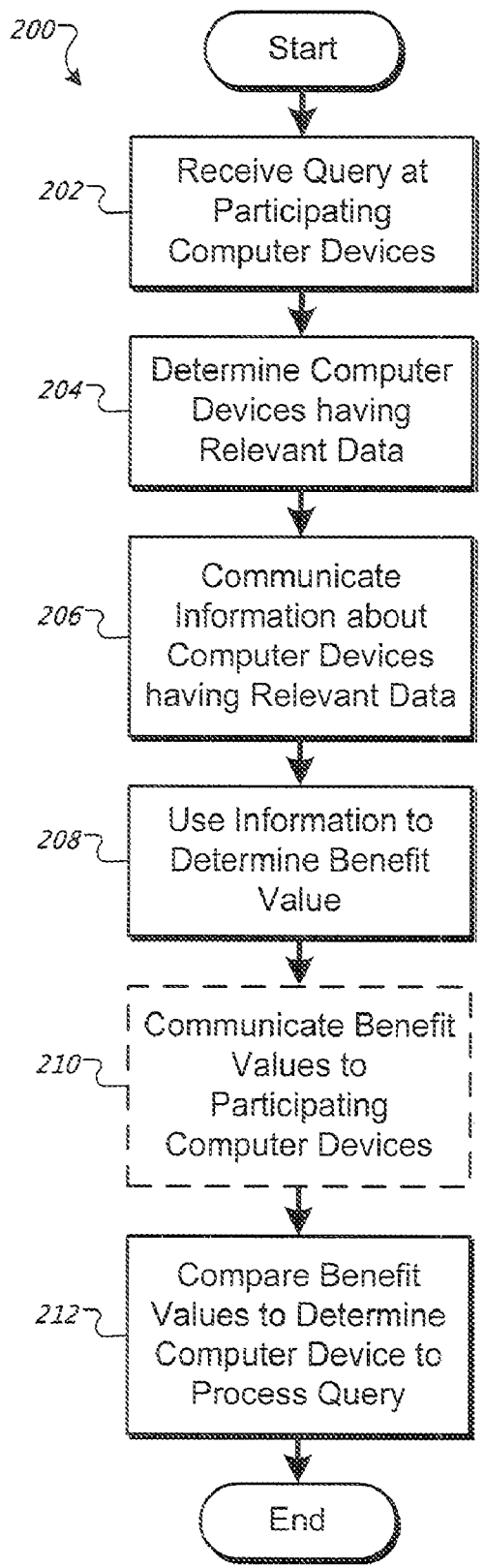
FIG. 2 is a flow chart showing an example of a process for managing queries in a distributed database system.

FIGS. 2 and 3 are flow charts showing examples of processes 200 and 208, respectively, associated with managing queries in a distributed database system. The processes 200 and 208 may be performed, for example, by a system such as the system 100. For clarity of presentation, the description that follows uses the system 100 as the basis of an example for describing the processes 200 and 208. However, another system, or combination of systems, may be used to perform the processes 200 and 208.

FIG. 2 is a flow chart showing an example of the process 200 for managing queries in a distributed database system. The process 200 begins with receiving (202) a query at participating computers. For example, the store server 106a and the RFID devices 108a-b receive the CheckRazorBlades trigger query.

The process 200 determines (204) which of the participating computers have data that is relevant to the query. For example, the RFID devices 108a-b determine that they have data relevant to the query using the sub-query that includes the foreign keys VendorID and ProductID.

The process 200 communicates (206) information about the computers having relevant data to the participating computer devices. For example, the RFID devices 108a-b communicated to each other and the store server 106a the amount of relevant data they each have as well as the typical amount of updates made to the relevant data and information about resources at the RFID devices 108a-b.

The process 200 uses (208) the communicated information to determine benefit values. For example, each participating computer may calculate its benefit value using the communi- The store server 106a and the RFID devices 108a-b may calculate initialization time (t) using the following equation:

$$t_i = \sum_{k \neq i} \frac{init_k}{\min(down_i, up_k)}$$

The initialization time is the time needed to transmit all relevant data to a computer device if it is the query master. For each computer device, the calculation above divides the amount of relevant data for every other computer by the network throughput (e.g., the lowest of the available download bandwidth for the computer device receiving the relevant data or the available upload bandwidth of the computer device providing the relevant data) and sums each division. The initialization time calculations for each of the participating computers are as follows:

$$t_{106a} = \frac{321{,}120 \text{ bits}}{6 \text{ Mb/s}} + \frac{430{,}560 \text{ bits}}{4 \text{ Mb/s}} = 161.2 \text{ ms}$$

$$t_{108a} = \frac{430{,}560 \text{ bits}}{2 \text{ Mb/s}} = 215.3 \text{ ms}$$

$$t_{108b} = \frac{321{,}120 \text{ bits}}{4 \text{ Mb/s}} = 80.3 \text{ ms}$$

The process 208 calculates (304) a network usage. For example, the store server 106a and the RFID devices 108a-b may calculate network usage (n) using the following equation:

$$n_i = \sum_{k \neq i} \frac{update_k}{down_i}$$

The network usage is the percentage of network bandwidth a computer device will use while downloading updates to the relevant data if it is the query master. The network usage calculations for each of the participating computers are as follows:

$$n_{106a} = \frac{64,224 \text{ bits}}{12 \text{ Mb}} + \frac{107,640 \text{ bits}}{12 \text{ Mb}} = 14.3\%$$

$$n_{108d} = \frac{107,640 \text{ bits}}{2 \text{ Mb}} = 53.8\%$$

$$n_{108b} = \frac{64,224 \text{ bits}}{4 \text{ Mb}} = 16.1\%$$

The process 208 calculates (306) a memory usage. For example, the store server 106a and the RFID devices 108a-b may calculate memory usage (m) using the following equation:

$$m_i = \sum_{k \neq i} \frac{init_k}{mem_i}$$

The memory usage is the percentage of memory usage a computer device will use while receiving the initial relevant data if it is the query master. The memory usage calculations for each of the participating computers are as follows:

$$m_{106a} = \frac{321,120 \text{ bits}}{121 \, MB \cdot 8} + \frac{430,560 \text{ bits}}{121 \, MB \cdot 8} = 0.7\%$$

$$m_{108a} = \frac{321,120 \text{ bits}}{19 \, MB \cdot 8} = 2.1\%$$

$$m_{108b} = \frac{430,560 \text{ bits}}{21 \, MB \cdot 8} = 2.4\%$$

The process 208 calculates (308) a benefit value. For example, the store server 106a and the RFID devices 108a-b may calculate benefit values (b) using the following equation:

$$b_i = \frac{cpu_i}{1,000} - \ln(m_i) - \ln(n_i)$$

The benefit value calculation scales the CPU usage down by a factor of 1000 and subtracts the natural logarithm of the memory usage and the network usage. This increases the benefit value as the memory usage and network usage approach zero. The benefit value calculations for each of the participating computers are as follows:

$$b_{106a} = \frac{1,000 \text{ MHz}}{1,000} - \ln(0.007) - \ln(0.0143) = 10.20$$

$$b_{108a} = \frac{200 \text{ MHz}}{1,000} - \ln(0.021) - \ln(0.0538) = 6.98$$

$$b_{108b} = \frac{233 \text{ MHz}}{1,000} - \ln(0.024) - \ln(0.0161) = 8.09$$

The store server 106a determines that it has the highest benefit value (10.20) and accordingly processes the query. The store server 106a holds the tables of data from the RFID devices 108a-b in memory and a materialized view of the join tables. The store server 106a requests that the RFID devices 108a-b periodically send updates made to the relevant data at the RFID devices 108a-b to the store server 106a. The store server 106a uses the updates to update its tables in memory and its materialized view of the joined tables. If the store server 106a receives an update to the materialized view indicating five or more razor blades have been removed in less than five seconds, then the store server 106a issues the theft notification to the employees.

Initialization time, network usage, and memory usage are three examples of properties that may be used to calculate a benefit value. Other properties of the computer devices or the system 100 may be used. For example, initialization time may be omitted where it does not significantly effect the processing of the query, such as where the amount of relevant data is small or where the updates to the relevant data are significantly larger than the initial relevant data. In another example, if the amount of memory or network bandwidth used is significantly smaller than the amount of memory or network bandwidth available, then the memory or network usage may be omitted. In another example, the amount of time needed to save the data to a hard drive at the query master and/or the amount of time to read from a hard drive at the data source may be used when calculating the benefit value. In another example, the amount of available CPU at each data source computer device may be used in calculating the benefit value. In another example, the amount of energy used by the query master may be included in the benefit calculation, for example to reduce operating costs. Alternatively, the benefit value could be a cost function where lower values indicate a lower cost of operation. In this cost function example, the computer device having the lowest benefit value (e.g., cost) is determined to be the query master.

Figure 4:
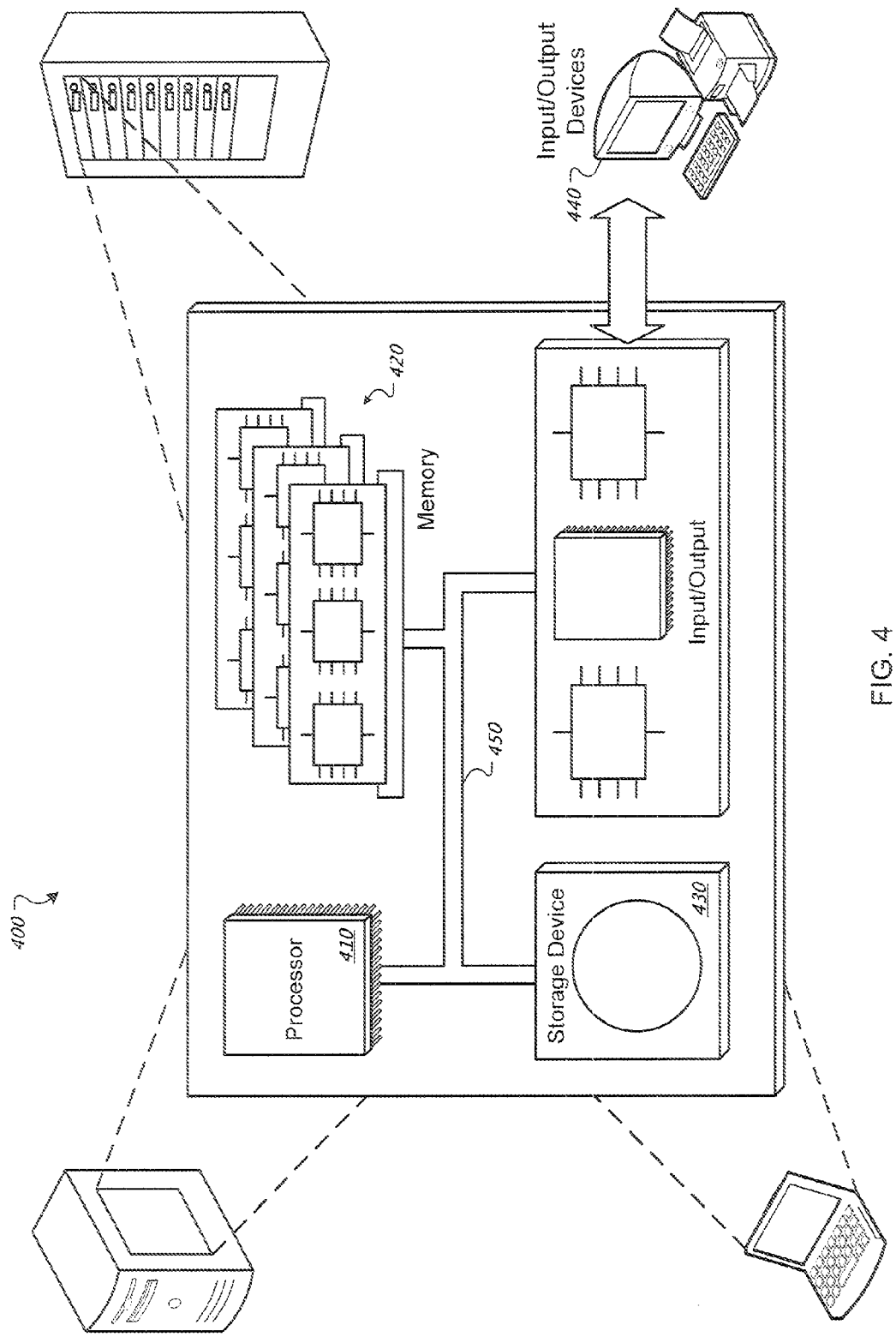
FIG. 4 is a schematic diagram showing an example of a generic computer system.

FIG. 4 is a schematic diagram showing an example of a generic computer system 400. The system 400 can be used for the operations described in association with the method 300 according to one implementation. For example, the system 400 may include or be included in either or all of the data center 102, the store servers 106a-b, and the RFID devices 108a-d.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment. The computer programs of systems 100, 400 may reside in or be otherwise organized into programming modules, engines, routines, subroutines and the like, with or without associated hardware.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage deices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. The logic flows depicted in the figures do not require the particular order shown, or sequential order, to achieve desirable results. In addition, other steps may be provided, or steps may be eliminated, from the described flows, and other components may be added to, or removed from, the described systems. Nevertheless, it will be understood that various modifications may be made without departing from the spirit and scope of the following claims. Accordingly, other implementations are within the scope of the following claims.

What is claimed is:

1. A computer-implemented method comprising:
receiving a query at computer devices participating in a database system, the query including a clause with a foreign key that identifies a product being tracked by fewer than all of the computer devices participating in the database system;
formulating a sub-query at the computer devices, the sub-query including the foreign key that identifies the product as a condition;
performing the sub-query at the computer devices;
selecting a subset of the computer devices having data relevant to the query, based on a result of performing the sub-query;
communicating, among the subset of computer devices having data relevant to the query, information about each computer device of the subset, the information including an amount of data identified at each respective device as a result of the sub-query, an amount of updates made to the identified data during a time interval, and information processing capabilities of each respective device;
using the information communicated to determine, at each computer device of the subset, a benefit value for at least one of the computer devices of the subset;
selecting, from among computer devices of the subset, a single computer device having the highest benefit value; and
processing the query using the single computer device having the highest benefit value;
wherein the information processing capabilities of each respective device further comprises:
an amount of time to download the identified data from each of the other computer devices of the subset, an amount of bandwidth used when downloading updates made to the identified data, and an amount of memory used by the identified data.

2. The method of claim 1, further comprising communicating the benefit values of each computer device of the subset among all of the computer devices.

3. The method of claim 1, wherein the single computer device having the highest benefit value is selected at run-time.

4. The method of claim 1, wherein the database system comprises an active database system, and wherein receiving the query comprises receiving multiple active queries over time, and wherein the single computer device having the highest benefit value is selected for each of the queries prior to execution.

5. The method of claim 1, wherein the database system comprises a hierarchy of participating computer devices, the participating computer devices including multiple RFID readers, multiple store servers, and at least one data center, and wherein selecting the subset of the computer devices further comprises accessing data structures at the RFID reader related to the product.

6. The method of claim 1, further comprising issuing the query to the database system and broadcasting it over a network to at least some of the participating computer devices.

7. The method of claim 1, wherein the query comprises a trigger, and further comprising generating an alert in response to conditions of the trigger being met.

8. The method of claim 1, wherein at least one of the computer devices comprises a smart shelf capable of tracking the product as a consumer removes the product from the smart shelf.

9. The method of claim 1, wherein the clause comprises a WHERE clause.

10. The method of claim 1, wherein, for a particular computer device of the subset, the benefit value is calculated in part, as expressed below:

$$t_i = \sum_{k \neq i} \frac{init_k}{\min(down_i, up_k)}$$

wherein $t_i$ represents initialization time, $init_k$ represents an amount of relevant data for every other computer device of the subset, $down_i$ represents an available download bandwidth for the particular computer device, and $up_k$ represents an available upload bandwidth for the particular computer device.

11. The method of claim 1, wherein, for a particular computer device of the subset, the benefit value is calculated in part, as expressed below:

$$n_i = \sum_{k \neq i} \frac{update_k}{down_i}$$

wherein $update_k$ an amount of updates to the identified data, and $down_i$ represents an available download bandwidth for the particular computer device.

12. The method of claim 1, wherein, for a particular computer device of the subset, the benefit value is calculated in part, as expressed below:

$$m_i = \sum_{k \neq i} \frac{init_k}{mem_i}$$

wherein $init_k$ represents an amount of relevant data for every other computer device of the subset, and $mem_i$ represents an amount of free memory for the particular computer.

13. The method of claim 1, wherein, for a particular computer device of the subset, the benefit value is calculated in part, as expressed below:

$$b_i = \frac{cpu_i}{1,000} - \ln(m_i) - \ln(n_i)$$

wherein $cpu_i$ represents CPU usage for the particular computer device, $m_i$ represents memory usage for the particular computer device, and $n_i$ represents network usage for the particular computer device.

14. The method of claim 1, wherein the query is processed using the only single computer device having the highest benefit value, without processing the query using other computer devices of the subset having less than the highest benefit value.

15. A database system comprising:

one or more computer devices; and a computer-readable medium coupled to the one or more computer devices having instructions stored thereon which, when executed by the one or more computer devices, cause the one or more computer devices to perform operations comprising:

receiving a query at the computer devices participating in the database system, the query including a clause with a foreign key that identifies a product being tracked by fewer than all of the computer devices participating in the database system, formulating a sub-query at the computer devices, the sub-query including the foreign key that identifies the product as a condition, performing the sub-query at the computer devices, selecting a subset of the computer devices having data relevant to the query, based on a result of performing the sub-query, communicating, among the subset of computer devices having data relevant to the query, information about each computer device of the subset, the information including an amount of data identified at each respective device as a result of the sub-query, an amount of updates made to the identified data during a time interval, and information processing capabilities of each respective device, using the information communicated to determine, at each computer device of the subset, a benefit value for at least one of the computer devices of the subset, selecting, from among computer devices of the subset, a single computer device having the highest benefit value, and processing the query using the single computer device having the highest benefit value;

wherein the information processing capabilities of each respective device further comprises:

an amount of time to download the identified data from each of the other computer devices of the subset, an amount of bandwidth used when downloading updates made to the identified data, and an amount of memory used by the identified data.

16. A computer-readable storage medium encoded with a computer program comprising instructions that, when executed, operate to cause a computer to perform operations comprising:

receiving a query at computer devices participating in the database system, the query including a clause with a foreign key that identifies a product being tracked by fewer than all of the computer devices participating in the database system;

formulating a sub-query at the computer devices, the sub-query including the foreign key that identifies the product as a condition;

performing the sub-query at the computer devices;

selecting a subset of the computer devices having data relevant to the query, based on a result of performing the sub-query;

communicating, among the subset of computer devices having data relevant to the query, information about each computer device of the subset, the information including an amount of data identified at each respective device as a result of the sub-query, an amount of updates made to the identified data during a time interval, and information processing capabilities of each respective device;

using the information communicated to determine, at each computer device of the subset, a benefit value for at least one of the computer devices of the subset;

selecting, from among computer devices of the subset, a single computer device having the highest benefit value; and processing the query using the single computer device having the highest benefit value;

wherein the information processing capabilities of each respective device further comprises:

an amount of time to download the identified data from each of the other computer devices of the subset, an amount of bandwidth used when downloading updates made to the identified data, and an amount of memory used by the identified data.

17. The computer-readable storage medium of claim 16, wherein at least one of the computer devices comprises a smart shelf capable of tracking the product as a consumer removes the product from the smart shelf.

18. The computer-readable storage medium of claim 16, wherein the clause comprises a WHERE clause.

* * * * *